United States Patent [19]
Kennelly et al.

[11] Patent Number: 5,662,958
[45] Date of Patent: Sep. 2, 1997

[54] METHOD FOR MODIFYING CANOLA SEEDS FOR USE IN RUMINANT FEED

[75] Inventors: John Joseph Kennelly, Edmonton, Canada; Debra Diane Nielsen, Newark, Del.; William Isaac Lewis, Kingston, Canada; Mary Ellen Rowland, Highland, Ill.

[73] Assignee: Ducoa, L.P., Highland, Ill.

[21] Appl. No.: 713,594

[22] Filed: Sep. 16, 1996

Related U.S. Application Data

[63] Continuation of Ser. No. 372,267, Jan. 12, 1995, abandoned, which is a continuation-in-part of Ser. No. 46,711, Apr. 16, 1993, abandoned.

[51] Int. Cl.$^6$ .............................. A23L 1/20; A23K 1/18
[52] U.S. Cl. .................... 426/630; 426/309; 426/635; 426/460; 426/507
[58] Field of Search .................. 426/287, 309, 426/630, 635, 636, 460, 507, 623

[56] References Cited

U.S. PATENT DOCUMENTS

| | | | |
|---|---|---|---|
| 695,476 | 3/1902 | McFarlane | 426/287 |
| 3,264,113 | 8/1966 | Barta | 426/482 |
| 3,305,441 | 2/1967 | Kohn | 426/286 |
| 3,760,459 | 9/1973 | Riley | 426/2 |
| 3,966,998 | 6/1976 | Rawlings | 426/632 |
| 4,148,789 | 4/1979 | Kozlowski | 426/656 |
| 4,208,433 | 6/1980 | Basham | 426/309 |
| 4,369,195 | 1/1983 | Nelson | 426/460 |
| 4,642,317 | 2/1987 | Palmquist et al. | 514/558 |
| 4,806,475 | 2/1989 | Gould | 162/78 |
| 4,919,940 | 4/1990 | Wellons | 426/2 |
| 5,094,868 | 3/1992 | Wolfram | 426/507 |
| 5,270,062 | 12/1993 | Buchs | 426/630 |

OTHER PUBLICATIONS

Hawley's Condensed Chemical Dictionary, Tenth Ed., Van Nostrand Reinhold Co., NY, NY, (1981) p. 545.
Abstract (AN 72(11)):G0534 FSTA) "Diffusion Extraction of Glucosinolates from Ropeseed", Sosulski, F.W. et al., Canadian Institute of Food Technology Journal, (1972) 5(2) pp. 101–104.
Abstract, (AN 79–59953B/33) of DD–136096–A to Mieth et al. Jun. 20, 1979.
The CRC Handbook of Chemistry and Physics, The Chemical Rubber Co., (1971), p. D–105.
S.R. Hoover, Preventive Medicine 2, pp. 361–365 (1973).
T.R. Wrenn et al., J. Dairy Sci., 59, pp. 627–635 (1975).
R. D. Plowman et al., J. Dairy Sci. 55, pp. 204–207 (1972).
T.W. Scott et al., J. Amer. Oil Chem. Soc. 48 pp. 358–369 (1971).
J. Bitman et al., J. Amer. Oil Chem. Soc. 50, pp. 93–98 (1973).

Primary Examiner—Daniel Semmer

[57] ABSTRACT

A method for treating canola seeds for use in ruminant feed is disclosed. The method consists of treating substantially intact canola seeds at a temperature of 30°–90° C. with an aqueous alkaline solution, the solution having a pH of 10–14 and comprising 1–20% by weight, based on the dry weight of the seeds, of alkaline agent. The integrity of the seed coat of the canola seeds remains substantially intact during treatment. When treated seeds are fed to ruminants, the triglycerides, fatty acids and protein present in the treated seeds bypass the rumen, and are digested in the abomasum and the small intestine. Ruminant feeds comprising the treated seeds and methods for feeding these feeds to ruminants are also disclosed.

10 Claims, No Drawings

METHOD FOR MODIFYING CANOLA SEEDS FOR USE IN RUMINANT FEED

CROSS-REFERENCE TO RELATED APPLICATIONS

This is a continuation of application Ser. No. 08/372,267 filed Jan. 12, 1995, now abandoned, which is a continuation-in-part of U.S. patent application Ser. No. 08/045,711, filed Apr. 16, 1993, incorporated herein by reference, now abandoned.

FIELD OF THE INVENTION

The invention is a method for modifying canola seeds that are indigestible in the ruminant digestive tract to render them suitable for use in ruminant feeds.

BACKGROUND OF THE INVENTION

The feeding of ruminants (bovine animals, sheep, goats, and other animals of the suborder Ruminantia) presents special problems and special opportunities. Special opportunities arise from the ability of ruminants to utilize insoluble cellulosic fiber which can be broken down by certain microorganisms but is generally not digestible by monogastric mammals such as pigs. The special problems arise from the tendency of certain feeds to inhibit digestion of fiber in the rumen and from the tendency of the rumen to limit the utilization of some of the components of certain feeds such as fat and protein.

Traditional feeds have not been able to meet the energy demands of ruminants, especially dairy cattle. This prevents dairy cattle from maximizing their potential in terms of milk production. The most common approach to increasing the energy density of the bovine diet is to increase the proportion of grain at the expense of forage. However, excessive grain in the diet has been shown to be associated with metabolic disorders which have a negative impact on the productive and reproductive performance of the animal, which in turn has been associated with a marked reduction in the life span of dairy cows.

An alternative way to increase the energy intake of ruminants is to increase their intake of triglycerides having saturated and unsaturated fatty acid residues (sometimes collectively referred to as "fats"; the unsaturated fats are sometimes referred to as "oils"). Fats can be an excellent source of energy for ruminants, but too much fat in the rumen can disrupt some of the highly complex ruminant digestion processes. For example, fat can coat fiber in the feed, thereby decreasing digestion of cellulose in the rumen. Fats can be toxic to microorganisms in the rumen and can decrease cation availability.

Wellons, U.S. Pat. No. 4,919,940, proposed an increase in the proportion of saturated fatty acid residues in triglycerides mixed with the dry matter of ruminant feeds, because saturated fats have less harmful effects in the rumen than unsaturated fats. But apparently, the saturated fat content of cattle feed can have an effect upon the degree of saturation of milk fat. Since the effect of saturated fats on sterol levels in humans is a matter of some concern, there may be drawbacks inherent in Wellons' approach to the formulation of feeds.

Palmquist, U.S. Pat. No. 4,642,317, proposes supplying fatty acids from tallow, for example, to ruminants in the form of their calcium salts. However, Palmquist expresses reservations about the use of high levels of calcium salts of unsaturated fatty acids (such as the calcium salt of linolenic acid), because unsaturated triglycerides are said to cause milk fat to turn rancid very quickly.

Another proposal involves "protecting" fats with a coating or encapsulation or some similar temporary barrier to digestion typically comprising protein treated with an aldehyde such as formaldehyde. The "protected" unsaturated fats pass through the rumen without being digested and without being hydrogenated and are absorbed further on in the digestive tract of the ruminant. Typically, safflower oil or ground soybeans and sunflower seeds are enclosed or encapsulated in formaldehyde-treated casein or the like and fed to dairy cattle. The formaldehyde-treated protein resists breakdown in the rumen but is hydrolyzed in the acidic environment of the abomasum. The triglycerides in the safflower oil or ground soybeans or ground sunflower seeds bypass the rumen and are digested further on in the digestive tract, thereby providing an energy source for the cattle without disrupting fermentation processes in the rumen.

While ruminants derive energy solely from feeds, they derive their protein needs from a combination of microbial protein (derived from microbes present in the rumen) and feed protein that escapes digestion (bypasses) the rumen. Since there is a limit to microbial protein synthesis, bypass protein required increases as milk production increases. It is now common practice to include a source of bypass protein in the diet of lactating dairy cows. Inclusion of such protein sources as well as an energy source is essential for these animals to achieve their genetic potential for milk production.

There are many commercial forms of bypass fat and protein on the market. Most of the commercially available bypass fats are in one of the "protected" forms. Some of the protein content of cattle feed is obtained as a by-product of vegetable oil manufacturing processes. The meal (crushed seeds) left over after the vegetable oil has been removed is high in protein and low in triglyceride content.

A need exits for a method for increasing the energy content of the diet of ruminants, especially dairy cattle, that is relatively simple to use but (1) does not adversely affect digestion in the rumen and (2) does not increase the amount of saturated fatty acid in the milk.

SUMMARY OF THE INVENTION

In one embodiment, the invention is a method for modifying triglyceride- and protein-containing seeds for use in ruminant feed. The method comprises treating substantially intact canola seeds at a temperature of 30°–90° C. with an aqueous alkaline solution containing 1–20% by weight, based on the dry weight of the seeds, of alkaline agent, the solution having a pH of 10–14.

In another embodiment, the invention is a ruminant feed composition comprising an admixture of 1–30% by weight of modified seeds with conventional ruminant feeds containing digestible fiber cellulosic material and a source of protein and grain.

In still another embodiment, the invention is a method for feeding triglycerides, fatty acids and protein to a ruminant without substantially inhibiting digestive processes in the rumen.

DETAILED DESCRIPTION OF THE INVENTION

A method for treating the oil seeds, especially canola seeds, to provide improved digestibility in the abomasum and small intestine of ruminants, without adversely affecting the microorganisms in the rumen, has been found. Seeds are treated with a base, i.e., an alkaline agent, and, optionally, hydrogen peroxide, at an elevated temperature to partially degrade the seed coat. This treatment is mild enough to cause the treated seeds to pass through the rumen without releasing undesirably large mounts of fatty acids, but is sufficient to cause the seeds to breakdown in the acidic environment of the abomasum and the small intestine. While the method is particularly effective for the treatment of seeds of the genus Brassica, such as mustard seed, rapeseed, and canola seed, it can also be used for the treatment of other oil seeds that are indigestible in the ruminant digestive tract.

Canola has many varieties and is a genetic derivative of rapeseed. Canola has an oil component that contains less than 2% erucic acid and a solid component that contains less than 30 micromoles of any one or any mixture of glucosinolates per gram of air-dry, oil-free solid, as measured by the gas chromatographic method specified by the Canadian Grain Commission. Rapeseed has a higher content of one or both of erucic acid and glucosinolates, which makes it far less suitable for animal consumption.

Canola seeds are a conventional source of vegetable oil. Canola seeds, like other oil-containing seeds, have been crushed so that the oil can be removed and used in the food industry. The by-product, canola meal, has been used in high protein cattle feed but does not contribute to the triglyceride or energy content of the feed.

Seeds of the genus Brassica, especially canola seeds, have the potential for significantly increasing both the amount of energy and the amount of protein in rations for cattle and other ruminants. Plant structural carbohydrates and lignin within the canola seed coat prevent extensive degradation of cellulose and hemicellulose by cellulolytic microorganisms in the rumen or by the acidic environment of the abomasum and the small intestine. Some method of treatment is required to alter the seed to a form suitable for utilization by ruminants. Unlike the seed crushing process, the triglyceride content of the seed is not lost in this process. In addition, since the seed coat is part of the whole seed structure, it is not necessary to encapsulate the triglycerides. Thus, it is important that whole or substantially intact seeds are used. Although the natural seed coat is treated to make it more susceptible to degradation in an acidic environment, the seed coat remains substantially intact after treatment. It does not open and is not removed from the seeds. The treated seeds, with the seed coat substantially intact, are fed to ruminants.

An alkaline treatment of the canola seed, optionally combined with a hydrogen peroxide treatment, alters the seed coat so that it is broken down only slightly in the rumen but is very susceptible to degradation in an acidic environment. Treatment causes swelling of the seed without substantially impairing the integrity of the seed coat. Consequently, fat bypasses the rumen and is released and digested further in the digestive tract. The treated seed can be used in feeds for ruminants to increase both protein content and triglyceride content, especially the bypass fat or oil content, of the animals' diet.

Whole or substantially intact seeds are used. Although other oil seeds may be used, the preferred seeds are canola seeds, preferably those of the species *B. napus*, the species *B. campestris*, and varieties thereof. Preferably the seeds are screened prior to treatment, but are not crushed or disintegrated, so that the natural seed coat is physically unaltered.

The seeds are treated with an aqueous alkaline solution at a temperature elevated above room temperature but below the boiling point of the solution, preferably a temperature in the range of 30°–90° C., and especially 50°–80° C. The alkaline solution contains 2–10% by weight, preferably 5–8% by weight of the alkaline agent, based on the dry weight of the whole or intact seeds. The concentration of the alkaline agent can be selected to provide a treatment medium having a pH of 10 to 14, preferably 10.5–13. Water-soluble inorganic bases, such as potassium hydroxide, can be used as the alkaline agent. Sodium hydroxide is preferred.

Although treatment of the seeds with that hydrogen peroxide is not essential, hydrogen peroxide treatment facilitates the breakdown of lignocellulose materials and enhances the palatability of the treated seeds. In one embodiment, alkaline treatment is combined with hydrogen peroxide treatment. Gould, U.S. Pat. Nos. 4,649,113, and 4,806,475, discloses treatment of lignocellulosic plant residues with moderately alkaline hydrogen peroxide as a means of obtaining dietary fiber for monogastric mammals, including humans. A particularly convenient way to provide a treatment is by combining the alkaline agent and hydrogen peroxide. The hydrogen peroxide content of the treatment solution can range from 0–4% by weight, preferably 0.5% to 2.5%, based on the dry weight of the canola seed being treated.

In general, treatment is carried out by admixing the caustic, peroxide and seeds for a time sufficient to effect uniform coating of the seeds. It is preferred that the admixture remain free flowing. Treatment times as short as one minute are effective to obtain uniform coating of the seeds, but at least five minutes are preferred. Additional time is preferred after hydrogen peroxide addition. When hydrogen peroxide is initially included in, or later added to, the treatment solution, hydrogen peroxide treatment times preferably range from about 1 to about 30 minutes, more preferably 5 to 20 minutes.

Once the treatment solution has been formulated, the canola seed can be admixed, coated or sprayed with this solution. All of the aqueous solution added to the canola seed appears to be adsorbed on the seed, therefore no waste stream is formed.

It is believed that treatment of the seeds with hydrogen peroxide in an alkaline medium has a strong effect upon cellulosic and hemicellulosic material (and perhaps lignins, if present) in the outermost layer or layers of the seed structure. When hydrogen peroxide is used in conjunction with the alkaline agent, the alkalinity of the treatment solution need not be as high as that of 50 wt-% sodium hydroxide or potassium hydroxide and can be more moderate, e.g. at pH of 13 or less. Treatment improves digestibility of the canola seeds, but digestibility is not equal to that provided by crushing the seeds. Severe treatments that excessively degrade the seed coat should be avoided. It is not essential that the treated seed be dried, but a moisture content of about 1% to 20% is preferred.

In a preferred embodiment, the seeds are treated so that less than 30% and preferably less than 20% by weight of the fat in the seeds is released in the rumen. More than 50%, and preferably more than 60%, by weight of the fat in the seeds is released and digested further on in the digestive tract of the ruminant in a substantially non-fermenting digestive organ, particularly in the abomasum and small intestine.

INDUSTRIAL APPLICABILITY

Treated canola seeds may be used in the form in which they are recovered from the process. They can be added to the regular diet of ruminants as an energy and protein supplement. Treated seeds are preferably added directly or as part of a concentrate that constitutes a minor amount of the fully formulated cattle feed. The major amount of the concentrate preferably comprises whole feed grains, ground up feed grains, and the like. Treated canola seeds need not constitute more than about 30% by weight of the daily ration, and can constitute as little as 1% by weight of the ration.

The composition of a ruminant feed can vary greatly depending on the breed, age, sex, and stage of lactation of the animal; the season of the year; and the cost and availability of other ingredients. A typical ruminant feed of this invention contains treated canola seeds with the seed coats substantially intact mixed with other conventional ruminant feed ingredients. A typical ruminant feed of this invention comprises 1–30% by weight treated canola seeds; 30–70% by weight of fibrous, cellulosic material digestible by ruminants, such as, silage, crop by-products, fibrous plant matter, roughage, or forage (hay, alfalfa, clover, etc.); 10–60% by weight of whole and ground feed grains (corn, wheat, oats, etc.); and up to 22% by weight (0–22% by weight) of conventional nitrogen sources and protein precursors (fish meal, soybean meal, cottonseed meal, linseed meal, canola meal, nitrogen compounds, etc.). Small amount of high energy sources and taste-improving agents, such as molasses, as well as vitamin/mineral supplements are also typically present in ruminant feeds. The feed components are typically thoroughly mixed prior to feeding. The feed should not be ground after addition of the treated canola seeds because grinding would alter or destroy the substantially intact seed coats of the treated canola seeds. Other treatments that would destroy the substantially intact seed coats of the treated canola seeds should be avoided.

The ruminant feed of this invention can be fed throughout much of the life cycle of the animal. In the case of dairy cows, these feeds can be used throughout the adult life of the cattle. These feeds are particularly advantageous during lactation when the energy requirements of the cattle are greatest. Digestion of cellulosic materials and fermentation processes in the rumen are not substantially inhibited and proceed normally when ruminants are fed with feed of this invention.

The advantageous properties of the invention can be observed by reference to the following examples which illustrate, but do not limit, the invention.

EXAMPLE 1

A sample of 100 g of dried whole canola seed was placed in a 2 L flask; the flask was substantially surrounded by a temperature-controlled heating jacket. The heating jacket was heated to 70° C. A mixture of 20 g of water and 14 g of 50% by weight solution of aqueous sodium hydroxide was added. The resultant admixture was stirred for 5 min. Then 20 g of water and 2 g of 50% by weight solution of aqueous hydrogen peroxide were added, and the mixture stirred for 10 min. A small sample was placed in a beaker, and an equal volume of distilled water added. The solution was mixed, and the pH measured. The resulting pH varied within the range of 11 to 13 depending on the amount of chemicals added per treatment. The final product had a black or dark red color and swollen seed coat with fissures apparent under an electron microscope. The seeds were dried to 12% moisture.

EXAMPLE 2

A 20 L mixer equipped with a heat jacket was loaded with 2.154 kg of canola seeds. The mixer was then turned on. The heat jacket was then activated and allowed to achieve a temperature of about 10° C. lower than desired. At this point the heat steadily climbed to the desired temperature and stabilized. When the desired temperature was achieved, the chemicals were added. Caustic was added first as 0.28 kg of a 50% by weight aqueous solution to 0.4 kg of water. This solution was then added to a pressure pot and then sprayed in two additions onto the canola seeds over a period of about 20 sec per addition. The admixture was allowed to mix for 5 min. When used as reported in the table, the aqueous hydrogen peroxide, as a 30% by weight solution, was added at this step. Then 0.06 kg was added to 0.4 kg of water. If not, then just 0.4 kg of water was added. In either case it took two additions of the solution at about 20 sec per addition to spray all of it onto the canola seeds. The admixture was then mixed for 10 min. The final product contained about 34% by weight moisture. The seeds were dried to 12% moisture.

EXAMPLES 3–23

These examples illustrate the effect of canola seed processing conditions on the disappearance of crude protein (CP), dry matter (DM), and fat from the rumen digestive system. Rumen degradability and intestinal digestion of crude protein, dry matter, and fat were determined by the nylon bag technique, described in G. de Boer, J. J. Murphy, and J. J. Kennelly, Can. *J. Anim. Sci.* 67, 93–102 (1987).

Three ruminally cannulated Holstein cows were fed 35% alfalfa silage, 60% whole crop oat silage, and 5% concentrate on a dry matter basis. The cows were permitted a 14 day adaptation period to the diet. The cows were fed 25 kg/day on an as-fed basis. The composition of the concentrate on an as-fed basis was: 71.3% rolled barley, 8.7% ground corn, 5.9% canola meal, 5.6% wheat shorts, 4.1% fish meal, 3.4% liquid molasses and 1% minerals and vitamins.

Treated canola seeds were prepared by the general procedure of Example 1 using various combinations of the processing variables of sodium hydroxide concentration, hydrogen peroxide concentration and temperature. The processing conditions are indicated in Table 1.

The nylon bag technique was used to estimate both rumen degradability and intestinal digestion of CP, DM, and fat. Control seeds or treated canola seeds, in which the integrity of the seed coat is substantially intact, were placed in a nylon bag and the bag inserted directly into the rumen of a ruminally cannulated Holstein cow through the cannula. At the end of the incubation period, the bag was removed from the rumen and the contents of the bag analyzed.

The bags were approximately 5.5×3.5 cm. Bags containing 1 g of test sample were incubated in the rumen for 8 hr. One bag from the 8 hr incubation time was then inserted into the small intestine through a duodenal cannula to estimate intestinal digestibility. Washed bags were dried at 60° C. for 24 hr and then dried at 105° C. in a forced air oven for another 24 hr. After DM determination, the bags plus contents were digested for Kjeldahl nitrogen determination and ether extract. Percent disappearance of DM, CP and fat at the 8 hr incubation was calculated from the proportion remaining after 8 hr incubation in the rumen. The disappearance rate was determined using the Orskov and McDonald equation [*J. Agric. Sci.* [*Camb.*] 92, 499 (1979)].

The effect of processing conditions on the disappearance of CP, DM, and fat from the ruminant digestive system is shown in Table 1. In general, an increase in temperature, with other variables constant, will increase disappearance of DM, CP, and fat in the rumen. High levels of caustic and temperature will produce a seed coat that is overtreated and unable to maintain its integrity in the rumen so that an undesirable amount of fat is released. Addition of peroxide to treated seed aids in the breakdown of the seed coat but has generally been used to increase palatability. Example 17 was the most successful treatment combining temperature and sodium hydroxide to maintain limited release of DM, CP, and fat in the rumen while achieving a substantial release of all three in the small intestine.

Polyester bags (7×13 cm: pore size 50 µm), each containing a 2 g test sample of canola seeds were tied securely with nylon string. Example 24 was carried out with untreated ground seeds. Examples 25–31 were carried out with treated seeds with the seed coat substantially intact. Example 32 was carried out with untreated whole seeds. Triplicates of each test sample were incubated in the rumen of each steer for 8 hr. The bags were placed in a nylon-mesh garment bag along with a 1 kg weight to secure bags in the ventral sac of

TABLE 1

EFFECT OF PROCESSING VARIABLES ON DISAPPEARANCE FROM THE RUMINANT DIGESTIVE SYSTEM

| | TREATMENT | | | DISAPPEARANCE (%) | | | | | | | | |
|---|---|---|---|---|---|---|---|---|---|---|---|---|
| | NaOH | $H_2O_2$ | Temp | RUMEN | | | INTESTINE* | | | WHOLE TREAT | | |
| EX # | (%) | (%) | (C.) | DM | CP | FAT | DM | CP | FAT | DM | CP | FAT |
| 3 | — | — | — | 3.42 | 2.10 | 0.0 | 11.98 | 17.52 | 2.92 | 15.40 | 19.62 | 2.92 |
| 4 | — | — | 70 | 3.90 | 2.59 | 0.0 | 11.40 | 14.28 | 5.13 | 15.30 | 16.87 | 5.13 |
| 5 | 5.5 | 1 | 70 | 23.97 | 15.80 | 27.97 | 17.35 | 21.06 | 17.64 | 41.32 | 36.86 | 27.97 |
| 6 | 6 | — | 60 | 22.51 | 16.15 | 26.21 | 13.39 | 18.15 | 18.47 | 35.90 | 34.30 | 26.21 |
| 7 | 6 | — | 70 | 29.60 | 24.25 | 12.14 | 33.62 | 49.80 | 36.55 | 63.22 | 74.05 | 48.69 |
| 8 | 6 | — | 80 | 43.31 | 37.40 | 27.15 | 23.11 | 30.39 | 36.09 | 66.42 | 67.79 | 63.24 |
| 9 | 6 | 1 | 45 | 18.52 | 12.68 | 2.62 | 5.83 | 10.09 | 7.14 | 24.35 | 22.77 | 9.76 |
| 10 | 6 | 1 | 60 | 25.32 | 17.30 | — | 20.70 | 27.79 | — | 46.02 | 45.09 | — |
| 11 | 6 | 1 | 70 | 31.19 | 28.49 | 2.19 | 24.86 | 32.36 | 39.97 | 56.05 | 60.85 | 42.16 |
| 12 | 6 | 1 | 80 | 43.24 | 37.26 | 24.38 | 31.59 | 41.70 | 44.92 | 74.83 | 78.96 | 69.30 |
| 13 | 6 | 2 | 60 | 25.85 | 25.21 | 21.09 | 13.58 | 11.90 | 15.07 | 39.43 | 37.11 | 36.16 |
| 14 | 6 | 2 | 70 | 40.43 | 36.44 | 16.31 | 31.02 | 39.24 | 51.14 | 71.45 | 75.68 | 67.45 |
| 15 | 6 | 2 | 80 | 53.62 | 52.61 | 33.01 | 25.08 | 33.68 | 33.53 | 78.70 | 86.29 | 66.54 |
| 16 | 6.5 | 1 | 70 | 48.82 | 48.48 | 32.54 | 31.85 | 34.71 | 53.28 | 80.67 | 83.19 | 85.82 |
| 17 | 7 | — | 60 | 31.75 | 26.26 | 11.31 | 35.27 | 43.58 | 71.43 | 67.02 | 69.84 | 82.74 |
| 18 | 7 | — | 70 | 44.33 | 46.94 | 26.42 | 28.13 | 34.61 | 41.96 | 72.46 | 81.55 | 68.38 |
| 19 | 7 | 1 | 45 | 27.50 | 23.53 | 6.59 | 26.87 | 34.09 | 40.86 | 54.37 | 57.62 | 47.45 |
| 20 | 7 | 1 | 60 | 43.07 | 35.06 | 30.70 | 31.98 | 45.08 | 44.02 | 75.05 | 80.14 | 74.72 |
| 21 | 7 | 2 | 45 | 25.34 | 13.65 | 7.64 | 18.19 | 32.57 | 22.23 | 43.53 | 46.22 | 29.87 |
| 22 | 7 | 2 | 60 | 37.59 | 29.31 | 17.92 | 32.37 | 52.60 | 52.95 | 69.96 | 81.91 | 70.87 |
| 23 | 7 | 2 | 70 | 52.74 | 45.98 | 36.70 | 26.15 | 40.57 | 35.30 | 78.89 | 86.55 | 72.00 |

*Values for intestinal data are differences between ruminal and whole tract digestibilities. Sorted based on treatment.

EXAMPLES 24–32

A 140 L mixer equipped with a jacket was loaded with 34.09 kg of canola seeds. The mixer was then turned on with the ploughs at approximately 60 RPM. Caustic was added using a pressure pot and a spray nozzle. Addition time was about 2.5 min. Water was then added to rinse the line; addition time was about 1 min. The aqueous hydrogen peroxide was then added with an addition time of about 1.5 min. Cooling water to the mixer jacket was turned on during the chemical addition to maintain a final temperature of 58°–62° C. The cooling water was then turned off when the seed temperature reached approximately 62° C. and the seeds were mixed for an additional 15 min before being discharged. The temperature of the seeds dropped to around 58° C. during this 15 min period. The final product contained about 16% moisture.

Two Angus×Simmental crossbred steers (average weight ca. 400 kg) fitted with 10.2 cm (i.d.) cannulas were fed orchardgrass hay (ad libitum) supplemented with 1 kg/day of a 16% crude protein corn-soybean meal concentrate. Steers were housed in a temperature controlled room at 22° C. with continuous lighting. Steers were adapted to the diet for 14 day.

Dry matter (DM), nitrogen (N) and ether extract (EE) degradability of test samples in the rumen were determined by the in situ method [Nocek, *J. Dairy Sci.* 71, 2051 (1988)].

the rumen. Empty polyester bags (blanks) were included with feed samples. Bags were washed until the wash water was clear. Bags were then dried for 24 hr (100° C.), allowed to air equilibrate, and then weighed for DM determination. Kjeldahl N was determined by digestion of incubated bags and residue in concentrated sulfuric acid. Ether extract was determined on incubated bags and residue refluxed with ether in a Soxhlet extractor for 24 hr. Disappearance of DM, N, and EE was calculated from the proportion of the original sample remaining after 8 hr incubation in the rumen. Results are given in Table 2.

TABLE 2

EFFECT OF PROCESSING VARIABLES ON DISAPPEARANCE FROM THE RUMEN

| | TREATMENT (o) | | | RUMEN DISAPPEARANCE | | |
|---|---|---|---|---|---|---|
| Example # | NaOH (%) | $H_2O_2$ (%) | Temp (C.) | DM (%) | CP (%) | FAT (%) |
| 24 | — | — | — | 43.31 | 55.68 | 35.54 |
| 25 | 7 | 1 | 60 | 45.39 | 40.52 | 45.58 |
| 26 | 6 | 1 | 60 | 36.84 | 32.38 | 37.62 |
| 27 | 5.5 | 1 | 60 | 32.01 | 26.47 | 9.85 |
| 28 | 5.35 | 1 | 60 | 29.27 | 22.40 | 10.65 |
| 29 | 5.25 | 1 | 60 | 29.72 | 23.39 | 13.03 |
| 30 | 5.15 | 1 | 60 | 26.41 | 18.82 | 8.72 |

TABLE 2-continued

EFFECT OF PROCESSING VARIABLES
ON DISAPPEARANCE FROM THE RUMEN

| | TREATMENT (o) | | | RUMEN DISAPPEARANCE | | |
|---|---|---|---|---|---|---|
| Example # | NaOH (%) | $H_2O_2$ (%) | Temp (C.) | DM (%) | CP (%) | FAT (%) |
| 31 | 5 | 1 | 60 | 20.88 | 11.13 | 8.28 |
| 32 | — | — | — | 0.08 | −8.96 | 4.68 |

(o) Example 24 was conducted with untreated ground seeds.
Examples 25-31 were conducted with treated seeds with the seed coat substantially intact.
Example 32 was conducted with untreated whole seeds.

The data show that rumen disappearance of DM, CP, and fat increased linearly with increasing concentrations of sodium hydroxide due to an increase in seed coat degradation.

EXAMPLE 33

This example shows the effect of treated canola seed on milk production and on the fatty acid composition of cream.

Twelve muliparous lactating Holstein dairy cows were allotted to one of three replicates of a 4×4 Latin square design. One replicate of cows was cannulated in the rumen. The eight remaining cows were randomly allotted to squares 2 and 3. Average days in milk at the beginning of the experiment was 46.7, with a range of 17 to 68 days.

The cows were fed the diets shown in Table 3. The diets contained alfalfa silage as the forage source and ground corn as the primary concentrate ingredient. Diets were fed as a total mixed ration. The crushed canola seeds were ground in a roller mill until all the seed hulls were cracked. The canola seeds in the treated diets were treated as described in Example 31 and added as recovered from the treatment.

During the trial, the cows were housed in tie-stall stanchions and fed twice daily at 12 hr intervals, i.e., at 11 AM and 11 PM. The complete diet was offered ad libitum, allowing at least 10% for orts. Water was available continually. Treatment periods were 28 days, with 21 days of adaptation to diets. Milk weights were recorded on days 22 to 28 of each period. Milk samples were taken on days 27 and 28 of each period. Daily AM and PM milk samples were composites, based on milk yield, and analyzed for solids not fat [N. S. Golding, J. Dairy Sci. 42, 899 (1959)], fat, protein, and protein components [New York Dairy Herd Improvement Association (DHIA)], and for long chain fatty acids [P. S. Sukhija and D. L. Palmquist, J. Agric. Food Chem. 36, 1202-1206 (1988). Analyses are given in Tables 4 and 5.

Abbreviations for Table 3: DM, dry matter; OM, organic matter; GE, gross energy; NEL, net energy of lactation; NDF, neutral detergent fiber; ADF, acid detergent fiber; N, nitrogen; CP, crude protein; UIP, undegraded intake protein; DIP, degraded intake protein; Ca, calcium; P, phosphorous; EE, ether extract; est, estimate.

TABLE 3

INGREDIENT COMPOSITION AND NUTRIENT PROFILE

| INGREDIENT | CONTROL | CRUSHED | TREATED | MEGALAC ® |
|---|---|---|---|---|
| Alfalfa silage | 45.0 | 45.0 | 45.0 | 45.0 |
| Corn (ground) | 37.0 | 31.3 | 31.3 | 31.6 |
| Soybean hulls | 6.2 | 6.2 | 6.2 | 6.2 |
| Canola seed | — | 11.2[a] | 11.2[b] | — |
| Canola meal | 5.6 | — | — | 5.6 |
| Magalac ® | — | — | — | 5.6 |
| Bloodmeal | 2.13 | 2.1 | 2.1 | 2.1 |
| Corn gluten meal | 2.1 | 2.1 | 2.1 | 2.1 |
| Vitamin/mineral premix[c] | 0.19 | 0.19 | 0.19 | 0.19 |
| Sodium bicarbonate | 0.75 | 0.75 | 0.75 | 0.75 |
| Magnesium oxide | 0.03 | 0.03 | 0.03 | 0.03 |
| Limestone | 0.29 | 0.29 | 0.29 | — |
| Dicalcium phosphate | 0.75 | 0.75 | 0.75 | 0.75 |
| Nutrient Profile | | | | |
| DM, % | 71.27 | 71.82 | 70.26 | 71.54 |
| OM, % of DM | 91.93 | 92.10 | 91.30 | 91.25 |
| GE, Mcal/kg | 4.41 | 4.69 | 4.62 | 4.63 |
| NEL, est (Mcal/kg DM) | 1.66 | 1.79 | 1.79 | 1.80 |
| NDF, % of DM | 35.65 | 39.24 | 37.90 | 35.17 |
| ADF, % of DM | 22.82 | 24.87 | 22.50 | 23.30 |
| N, % of DM | 3.08 | 2.94 | 2.93 | 3.07 |
| CP, % of DM | 19.25 | 18.38 | 18.31 | 19.19 |
| UIP, (est) % of CP | 36.6 | 36.2 | 36.2 | 36.3 |
| DIP, (est) % of DM | 63.4 | 63.8 | 63.8 | 63.7 |
| Ca, (est) % of DM | 1.04 | 1.06 | 1.06 | 1.39 |
| P, (est) % of DM | 0.47 | 0.48 | 0.48 | 0.45 |
| Added fat, % of DM | — | 4.5 | 4.5 | 4.5 |
| EE total, % | 3.85 | 9.27 | 8.08 | 4.42 |

[a]Crushed canola seeds.
[b]Treated canola seeds with the seed coat substantially intact.
[c]premix contained: Vitamin A, 2,202,643 USP/kg; Vitamin D3, 660,793 USP/kg; Vitamin E, 7,709 USP/kg; sulfur, 10%; potassium 7.5%; magnesium, 5%; zinc, 3.0%; manganese, 3%; iron, 2.0%; copper, 0.5%; iodine, 0.25%; selenium, 0.015%; and cobalt, 0.004%.

TABLE 4

FATTY ACIDS IN CREAM

| FATTY ACID | CONTROL | CRUSHED | TREATED | MEGALAC ® | SE[a] |
|---|---|---|---|---|---|
| 8:0[b] (caprylic) | 1.42 | 1.06 | 1.29 | 1.09 | 0.065 |
| 10:0 (capric) | 4.42 | 2.80 | 3.46 | 2.81 | 0.136 |
| 12:0 (lauric) | 5.56 | 3.32 | 3.98 | 3.27 | 0.119 |
| 14:0 (myristic) | 13.82 | 10.83 | 11.14 | 10.03 | 0.294 |
| 16:0 (palmitic) | 29.99 | 21.63 | 21.54 | 34.38 | 0.550 |
| 17:0 (margaric) | 0.55 | 0.42 | 0.44 | 0.36 | 0.020 |
| 18:0 (stearic) | 8.77 | 15.86 | 13.86 | 8.14 | 0.438 |
| 20:0 | 0 | 0 | 0 | 0 | |
| Other[c] | 8.15 | 7.49 | 8.54 | 7.27 | 1.661 |
| Total saturated | 72.68 | 63.41 | 64.25 | 67.35 | |
| 14:1 | 1.75 | 1.27 | 1.15 | 1.06 | 0.109 |
| 16:1 | 1.51 | 1.06 | 0.94 | 1.45 | 0.068 |
| 18:1 (oleic) | 20.13 | 33.60 | 30.04 | 26.23 | 0.652 |
| 18:2 (linoleic) | 3.43 | 3.28 | 4.21 | 3.71 | 0.084 |
| 18:3 (linolenic) | 0.74 | 0.78 | 1.23 | 0.56 | 0.071 |
| Total unsaturated[d] | 27.56 | 39.99 | 37.57 | 33.01 | |

[a]Standard Error
[b]Number of carbon atoms in acid:number of double bonds.
[c]Short chain (4 or 6 carbon) saturated fatty acids.
[d]Totals may not add to 100% due rounding and statistical analysis of errors.

TABLE 5

MILK PRODUCTION

| | CONTROL | CRUSHED | TREATED | MEGALAC ® | SE[a] |
|---|---|---|---|---|---|
| Milk production (kg/d) | 34.38 | 36.08 | 34.58 | 35.06 | 0.71 |
| Milk Composition | | | | | |
| Fat (%) | 3.52 | 3.43 | 3.77 | 3.64 | 0.09 |
| Fat (kg/d) | 1.21 | 1.23 | 1.30 | 1.27 | 0.04 |
| Solids non-fat (%) | 8.33 | 8.28 | 8.20 | 8.11 | 0.06 |
| Crude protein (%) | 3.31 | 3.25 | 3.21 | 3.10 | 0.03 |
| Crude protein (kg/d) | 1.14 | 1.17 | 1.10 | 1.08 | 0.02 |
| True protein (%) | 3.11 | 3.05 | 3.01 | 2.90 | 0.03 |
| True protein (kg/d) | 1.07 | 1.10 | 1.03 | 1.01 | 0.02 |
| Casein protein (%) | 2.49 | 2.48 | 2.43 | 2.35 | 0.02 |
| Casein protein (kg/d) | 0.85 | 0.89 | 0.84 | 0.82 | 0.82 |
| Whey protein (%) | 0.62 | 0.57 | 0.58 | 0.56 | 0.01 |
| Whey protein (kg/d) | 0.21 | 0.21 | 0.19 | 0.19 | 0.004 |
| NPN[b] (%) | 0.20 | 0.20 | 0.20 | 0.20 | 0.002 |

[a]Standard error.
[b]Protein equivalent non-protein nitrogen.

Having described the invention, we now claim the following and their equivalents.

What is claimed is:

1. A method for treating intact oil seeds of the genus Brassica, excluding rapeseed, which are indigestible in the rumen of ruminant animals, to provide improved digestibility of the seeds in the abomasum and small intestine of such animals comprising the sequential steps of:

(1) while subjecting the seeds to mixing, during which the seeds are free-flowing, heating the free-flowing seeds to a temperature of 30°–90° C.; and (2) while continuing mixing and heating of the seeds, maintaining the seeds in free-flowing form and spraying the heated seeds with an aqueous alkaline solution having a pH of 10–14 and continuing mixing of the coated seeds for a period of 1–30 minutes to effect adsorption of the alkaline solution onto the seed and swelling of the seeds without substantially impairing the integrity of the seed coat.

2. The method of claim 1 in which the aqueous alkaline treating solution contains 0.5–4.0% wt. hydrogen peroxide, basis weight of the treated seeds.

3. The method of claim 1 in which the oil seeds are Canola seeds.

4. The method of claim 3 in which the Canola seeds are selected from species *B. napus*, species *campestris* and varieties thereof.

5. The method of claim 1 in which the seed temperature is 50–80C.

6. The method of claim 1 in which the alkaline solution contains 2–10% alkali, basis dry seed weight.

7. The method of claim 6 in which the alkali is an alkali metal hydroxide.

8. The method of claim 7 in which the alkali metal hydroxide is sodium hydroxide.

9. The method of claim 1 in which the pH of the alkaline solution is 10.5–13.

10. The method of claim 1 in which the treated seeds are dried to a moisture content of 1–20% by weight.

* * * * *